(12) United States Patent
Horihata

(10) Patent No.: US 9,619,003 B2
(45) Date of Patent: *Apr. 11, 2017

(54) COMMUNICATION SYSTEM, RELAY DEVICE, AND METHOD FOR CONTROLLING POWER SUPPLY

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventor: Satoshi Horihata, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 193 days.

This patent is subject to a terminal disclaimer.

(21) Appl. No.: 14/378,029

(22) PCT Filed: Jan. 30, 2013

(86) PCT No.: PCT/JP2013/052006
§ 371 (c)(1),
(2) Date: Aug. 11, 2014

(87) PCT Pub. No.: WO2013/121881
PCT Pub. Date: Aug. 22, 2013

(65) Prior Publication Data
US 2015/0019897 A1    Jan. 15, 2015

(30) Foreign Application Priority Data

Feb. 17, 2012 (JP) .................. 2012-033292

(51) Int. Cl.
*G06F 1/32* (2006.01)
*H04L 12/46* (2006.01)
(Continued)

(52) U.S. Cl.
CPC .......... *G06F 1/3243* (2013.01); *G06F 1/3287* (2013.01); *H04L 12/12* (2013.01);
(Continued)

(58) Field of Classification Search
None
See application file for complete search history.

(56) References Cited

U.S. PATENT DOCUMENTS

2002/0006139 A1* 1/2002 Kikkawa ................. H04L 12/12
370/502
2003/0117298 A1 6/2003 Tokunaga et al.
(Continued)

FOREIGN PATENT DOCUMENTS

CN 1721226 A 1/2006
CN 101079649 A 11/2007
(Continued)

OTHER PUBLICATIONS

International Search Report issued in International Application No. PCT/JP2013/052006 mailed Mar. 26, 2013.
(Continued)

*Primary Examiner* — Paul Yanchus, III
(74) *Attorney, Agent, or Firm* — Oliff PLC

(57) ABSTRACT

The present invention provides a communication system including a relay device that is capable of simplifying the configuration of a control device for controlling a device based on relay information and reducing cost of the whole system, the relay device and a method for controlling power supply. A GW device includes first to fourth communication parts respectively connected to communication buses, which
(Continued)

are connected to ECUs respectively. The GW device receives a message transmitted from each of ECUs, extracts signal information S1 to S5 related to equipment in the vehicle included in the message from the received message, collects the extracted signal information S1 to S5 to create a message (ID4), and transmits the created message to a power supply control device. The power supply control device controls on/off of the ECUs and each of loads based on signal information included in the message received from the GW device.

13 Claims, 15 Drawing Sheets

(51) Int. Cl.
*H04L 12/64* (2006.01)
*H04L 12/12* (2006.01)
*H04L 12/40* (2006.01)
*H04L 12/66* (2006.01)

(52) U.S. Cl.
CPC .... *H04L 12/40039* (2013.01); *H04L 12/4625* (2013.01); *H04L 12/6418* (2013.01); *H04L 12/66* (2013.01); *H04L 2012/40215* (2013.01); *H04L 2012/40273* (2013.01); *Y02B 60/34* (2013.01)

(56) References Cited

U.S. PATENT DOCUMENTS

| 2005/0102430 A1* | 5/2005 | Huber .................. G06F 1/3203 709/250 |
| 2006/0013237 A1* | 1/2006 | Furuta ................... H04L 12/12 370/401 |
| 2007/0277193 A1 | 11/2007 | Mannikka et al. |
| 2011/0178678 A1 | 7/2011 | Asahara |
| 2012/0030330 A1* | 2/2012 | Rocher ............. H04L 12/40039 709/223 |

FOREIGN PATENT DOCUMENTS

| CN | 101123007 A | 2/2008 |
| CN | 100414917 C | 8/2008 |
| CN | 101301858 A | 11/2008 |
| CN | 101763104 A | 6/2010 |
| CN | 101959718 A | 1/2011 |
| CN | 102205800 A | 10/2011 |
| JP | A-2001-257694 | 9/2001 |
| JP | A-2002-111699 | 4/2002 |
| JP | A-2002-261790 | 9/2002 |
| JP | A-2004-122993 | 4/2004 |
| JP | 2005-022556 A | 1/2005 |
| JP | 2007-196971 A | 8/2007 |
| JP | A-2007-251722 | 9/2007 |
| JP | A-2009-232254 | 10/2009 |
| JP | 2009-278531 A | 11/2009 |
| JP | A-2010-101681 | 5/2010 |
| JP | 2011-039608 A | 2/2011 |

OTHER PUBLICATIONS

May 9, 2016 Office Action issued in U.S. Appl. No. 14/380,181.
Apr. 16, 2013 International Search Report issued in International Application No. PCT/JP2013/052540.
Nov. 4, 2016 Office Action issued in Chinese Patent Application No. 201380014001.5.
Sep. 18, 2016 Office Action issued in Chinese Patent Application No. 201380009658.2.
Aug. 29, 2016 Notice of Allowance issued in U.S. Appl. No. 14/380,181.

* cited by examiner

FIG. 7

ON/OFF TABLE

| CONDITIONS | | | | | CONTROL INFORMATION (INSTRUCTION TO TURN ON/OFF) |
|---|---|---|---|---|---|
| S1 | S2 | S3 | S4 | S5 | |
| 1 | 1 | 0 | 0 | 0 | 0 1 0 1 0 0 0 0 |
| 1 | 1 | 0 | 1 | 0 | 0 1 0 1 0 1 0 0 |
| 0 | 0 | 0 | 0 | 1 | 0 0 0 0 0 1 0 0 |
| ⋮ | ⋮ | ⋮ | ⋮ | ⋮ | ⋮ |
| 1 | 1 | 1 | 1 | 0 | 0 1 0 1 1 1 1 0 |

FIG. 11

VEHICLE STATE TABLE

| INPUT | | | | | | | | | OUTPUT |
|---|---|---|---|---|---|---|---|---|---|
| S1 | S2 | S3 | S4 | S5 | I1 | I2 | I3 | ... | |
| 1 | 1 | — | — | — | — | — | — | ... | scene 1 |
| 1 | 1 | 1 | 0 | — | — | — | — | ... | scene 2 |
| 1 | 1 | — | — | — | x | y | — | ... | scene 3 |
| ⋮ | ⋮ | ⋮ | ⋮ | ⋮ | ⋮ | ⋮ | ⋮ | ⋮ | ⋮ |
| 0 | 0 | 1 | 1 | 1 | — | — | z | ... | scene N |

F I G. 1 2

| VEHICLE STATE | CONTROL INFORMATION (INSTRUCTION TO TURN ON/OFF) |
|---|---|
| scene 1 | 0 1 0 1 0 0 0 0 |
| scene 2 | 0 1 0 1 1 1 0 0 |
| scene 3 | 0 0 0 0 0 0 0 1 |
| ⋮ | ⋮ |
| scene N | 0 0 0 0 1 1 1 1 |

COMMUNICATION SYSTEM, RELAY DEVICE, AND METHOD FOR CONTROLLING POWER SUPPLY

This application is the national phase under 35 U.S.C. §371 of PCT International Application No. PCT/JP2013/052006 which has an International filing date of Jan. 30, 2013 and designated the United States of America.

BACKGROUND OF THE INVENTION

1. Field of the Invention

The present invention relates to a communication system that includes a relay device for a relay of information among different communication buses. In particular, the present invention relates to a communication system capable of properly controlling power supply of the system while simplifying the configuration of a control device for controlling devices based on information to be relayed, a relay device constituting the communication system, and a method for controlling power supply of devices in the communication system.

2. Description of Related Art

In the technical field of vehicle control, the configuration in which several electronic control units (ECU) for respectively controlling devices mounted in a vehicle are connected by communication buses to transmit/receive information mutually for executing various processing is commonly used. Since the number of ECUs connected to a communication bus is limited or a communication speed is varied according to the function of an ECU, a configuration is adopted in which ECUs are divided into a plurality of groups, each of which is connected to a communication bus, and a relay device (gateway) is connected between different communication buses.

With a communication system including a relay device, each communication device transmits an information group of multiple pieces of information based on a communication protocol, and a relay device receives the information group collected and transmitted from each communication device and achieves a relay by determining whether or not the information group without modifications thereto is transmitted to another communication bus.

Specifically, in a case where a CAN (Controller Area Network) is generally used in a communication system related to vehicle control, each ECU stores signal information obtained from devices in the data part of a CAN message identified by CAN ID and collectively transmits the information. A relay device refers to a routing table stored for each CAN ID that specifies the necessity of a relay and a communication bus being a relay destination for each CAN message received and transmits a CAN message required for a relay to the communication bus being a relay destination, relay processing is achieved by a message routing function for transmitting the received CAN message without modifications thereto.

SUMMARY OF THE INVENTION

In the field of vehicle control particularly, since the number of functions realized by electronic control is increased, the number of communication devices in a communication system is also increased. A relay device not only performs a relay of information between two communication buses as the above disclosed, but it also needs to perform relay processing of information among three or more communication buses.

FIG. 15 is a schematic view that schematically shows an overview of processing in a case where conventional relay processing is applied to a relay device 90 that performs a relay among four communication buses. The relay device 90 in FIG. 15 is connected to four communication buses 91 to 94, and a relay of information is performed among the communication buses 91 to 94 respectively. For example, in a case where a CAN message A is received from the communication bus 91 and a CAN message B is received from the communication bus 92, the relay device 90 refers to a routing table based on the CAD ID of each message to determine the necessity of a relay. The relay device 90 then transmits the CAN message A required to be relayed from the communication bus 93 being a relay destination, and discards the CAN message B not required to be relayed.

Assume here that an ECU 95 connected to the communication bus 94 controls a plurality of devices and requires sensor information included in the CAN message A to be transmitted on the communication bus 91, switch information included in the CAN message C to be transmitted on the communication bus 92 and sensor information included in the CAN message D to be transmitted on the communication bus 93 for performing a control. In this case, since a conventional relay method performs a relay by message units, the relay device 90 transmits all three CAN messages A, C and D to the communication bus 94, which is connected to the ECU 95. The ECU 95 then receives three CAN messages A, C and D and obtains the necessary information from these CAN messages to perform a control. In this case, three CAN messages A, C and D received by the ECU 95 also includes signal information not required for a control carried out by the ECU 95. Since it is required to extract each piece of signal information at the ECU 95 and perform processing for determining a control, the relay device 90 and the ECU 95 need to perform determination processing, therefore, it is difficult to simply configure both devices. In addition, unnecessary information is also transmitted to the ECU 95, resulting in excessive usage of commutation resources.

Especially, light-weighting, space-saving and cost reduction are demanded in a communication system mounted to a vehicle. Accordingly, it is required to simplify at least one of the configurations of the conventional relay device 90 and the ECU 95.

In view of these circumstances, the present invention aims to simplify a control device for controlling devices based on information to be relayed and provide a communication system capable of properly controlling power supply of the system while reducing cost of the whole system, a relay device constituting the communication system and a method for controlling power supply of devices in the communication system.

A communication system according to the present invention including a plurality of communication buses; a plurality of communication devices respectively connected to the plurality of communication buses for transmitting/receiving an information group of one or a plurality of pieces of information; and a relay device having a plurality of communication parts respectively connected to the plurality of communication buses, transmitting/receiving an information group through the plurality of communication parts and performing a relay of information among different communication buses, the communication system is characterized by comprising one or a plurality of power supply control devices for communicating with the relay device and performing power supply control of one or a plurality of devices based on the information transmitted from the relay device;

and is characterized in that the relay device comprises: extracting means for extracting the information required for power supply control from the received information group; creating means for creating information related to power supply control; and means for transmitting the information created by the creating means to the power supply control device.

The communication system according to the present invention is characterized in that the creating means creates information related to power supply control with a group of information respectively extracted from different information groups by the extracting means.

The communication system according to the present invention is characterized in that the creating means creates control information for providing an instruction to turn power on/off of said one or a plurality of devices based on the extracted information.

The communication system according to the present invention is characterized in that the communication device, power supply control device, communication bus and relay device are mounted in a vehicle; and the relay device further includes specifying means for specifying a vehicle state based on one or a plurality of pieces of information included in the received information group, and the creating means creates information related to power supply control corresponding to the vehicle state specified by the specifying means.

The communication system according to the present invention is characterized in that the relay device further includes means for connecting with a sensor and a switch mounted in a vehicle or one of the sensor and the switch, and the creating means creates information related to the power supply control based on the information extracted by the extracting means and the information obtained from the sensor or the switch.

The communication system according to the present invention is characterized in that the relay device further includes out-of-vehicle communicating means for transmitting/receiving information to/from an out-of-vehicle communication device; and the creating means creates information related to the power supply control based on the information extracted by the extracting means and the information received by the out-of-vehicle communicating means.

The communication system according to the present invention includes a vehicle state table storing the correspondence between one or a plurality pieces of information included in the received information group, the information obtained from the sensor or the switch, or the information received by the out-of-vehicle communicating means, and state identification information for identifying a vehicle state determined from various pieces of information and the specifying means includes means for specifying a vehicle state based on the vehicle state table.

The communication system according to the present invention includes an on/off table storing information of the state of power on/off in which the one or a plurality of devices are to be in each vehicle state for different vehicle states respectively, and the creating means includes means for obtaining the information of power on/off corresponding to the vehicle state specified by the specifying means from the on/off table and creates control information for providing an instruction to turn power on/off of the one or a plurality of devices based on the obtained information.

The communication system according to the present invention is characterized in that the specifying means includes means for detecting an abnormal state of a vehicle and specifies that a vehicle is in an abnormal state when the means detects an abnormal state; and the creating means creates control information for providing an instruction to turn power on/off of a device related to the abnormal state of the vehicle.

A relay device according to the present invention including a plurality of communication parts respectively connected to different communication buses receives an information group of one or a plurality of pieces of information transmitted to various communication buses, and transmits an information group to the one or a plurality of communication buses for performing a relay of the information, the relay device is characterized by comprising: means for extracting information required for power supply control of an external device from the received information group; means for creating information related to power supply control based on the extracted information; and means for transmitting the created information to other devices.

A method for controlling power supply according to the present invention is a method for power supply control of one or a plurality of devices in a communication system that includes a plurality of communication buses; a plurality of communication devices respectively connected to any of the plurality of communication buses for transmitting/receiving an information group of one or a plurality of pieces of information; a relay device having a plurality of communication parts respectively connected to the plurality of buses for transmitting/receiving an information group through the plurality of communication parts to perform a relay of information among different communication buses; and one or a plurality of power supply control device communicating with the relay device for performing power supply control of the one or a plurality of devices based on the information transmitted from the relay device, the method comprising the steps of: the plurality of communication devices respectively transmit information groups; the relay device extracts information required for the power supply control from the various information groups received, creates information related to power supply control based on the extracted information and then transmits the created information related to power supply control to the power supply control device; and the power supply control device receives the information related to the power supply control to perform power supply control of the one or a plurality of devices based on the received information related to power supply control.

According to the present invention, a relay device extracts information related to power supply control of one or a plurality of devices to be controlled by a power supply control device from an information group of one or a plurality of pieces of information when the information group is received from a communication bus, and creates information required by the power supply control device (information required for power supply control) based on the extracted information and then transmits it to the power supply control device. The power supply control device is not necessary to extract information so that it is possible to simplify processing. An adjustment of power on/off, a current amount or a voltage value is also included in the power supply control.

According to the present invention, a relay device extracts the necessary information from information groups received respectively from different communication buses, and transmits information with a group of the extracted information (information related to power supply control) to a power supply control device which requires the information. With a power supply control device, it is possible to simplify processing without the need of extracting information.

According to the present invention, a relay device creates control information for providing instructions to turn power on/off of one or a plurality of devices controlled by a power supply control device based on the extracted information and transmits the created information. The power supply control device is not necessary to collect information for creating control information, only a simple configuration is required that the power supply control device pass devices the received control information.

According to the present invention, a communication system is an on-vehicle communication system, and a relay device specifies a vehicle state from the necessary information included in an information group transmitted from communication devices. The relay device creates information related to power supply control with a group of information to be need depending on the vehicle state and then transmits the created information to a power supply control device. The relay device connecting to a plurality of communication buses for receiving information intensively is capable of generally determining a vehicle state and efficiently performing processing. It is also possible to reduce an amount of information transmitted to the power supply control device for lessening a communication load.

According to the present invention, a relay device is directly connected to a sensor and a switch or any one of the sensor and switch for obtaining information indicative of a situation within a vehicle. The relay device consider not only the information transmitted/received through communication but also the information which can be acquired from the sensor or switch, and then creates information related to power supply control of one or plurality of devices. Fine power supply control corresponding to a vehicle state can be achieved.

According to the present invention, a relay device further includes an out-of-vehicle function, and the relay device also refers to information from outside the vehicle to create information related to power supply control of one or a plurality of devices. Fine power supply control corresponding to a vehicle state can be achieved.

According to the present invention, when a relay device specifies a vehicle state, it is specified based on a vehicle state table for storing the correspondence between the received information, the information acquired from a sensor or a switch, or the information received from out-of-vehicle, and the vehicle state specified by contents indicated by various pieces of information. It is capable of specifying a vehicle state by simple processing based on the stored table along with performing a fine power supply control by customizing the contents of the vehicle state table.

According to the present invention, when a relay device creates information related to power supply control corresponding to the vehicle state, the information related to power supply control is created based on an on/off table for storing the correspondence between a vehicle state and the information of the state of power on/off in which each device is to be in various vehicle states. It is capable of creating control information by simple processing based on the stored table along with performing a fine power supply control corresponding to the characteristics of various vehicles by customizing the contents of the on/off table.

According to the present invention, when it is specified that a vehicle is in an abnormal state, the control information with an instruction to turn power off of a device related to an abnormal state is transmitted from a relay device.

Effect of the Invention

According to the present invention, a relay device extracts and collects information required for power supply control, and then transmits it to a power supply control device. Accordingly, the power supply control device does not need to execute processing of obtaining respective pieces of necessary information from a plurality of information groups received. The power supply control device may perform control based on information related to power supply control transmitted from the relay device. Accordingly, it is possible to simplify the configuration of the power supply control device.

The relay device is capable of grasping information of the whole system to perform power supply control, therefore, the power supply control of the system can be appropriate with achieving power saving appropriately, preventing of battery exhaustion by cutting power supply to devices having lower order of priority of operation and the like.

The relay device according to the present invention does not determine the necessity of an information group received as in the conventional way and then perform transmission, but executes processing of creating information related to power supply control by collecting information required for each communication device and then performs transmission. Therefore, with the configuration connected with three or more different communication buses, it is possible to reduce a communication load without transmitting unnecessary information. The processing executed by the relay device becomes complicated, however, the configuration of the power supply control device and each communication device can be simplified so that it is also possible to reduce cost of the whole communication system.

BRIEF DESCRIPTION OF THE SEVERAL VIEWS OF THE DRAWINGS

FIG. 7 is an explanatory drawing that shows an example of the content of an on/off table included in a GW device according to Embodiment 2, FIG. 11 is an explanatory drawing that shows an example of the content of a vehicle state table included in a GW device according to Embodiment 3, FIG. 12 is an explanatory drawing that shows an example of the content of an on/off table included in the GW device according to Embodiment 3.

DETAILED DESCRIPTION

The present invention is particularly described with reference to the accompanying drawings which illustrate the embodiments thereof.

The following embodiments describe the case that the present invention is applied to an on-vehicle communication system for controlling on-vehicle devices.

Embodiment 1

Figure 1:
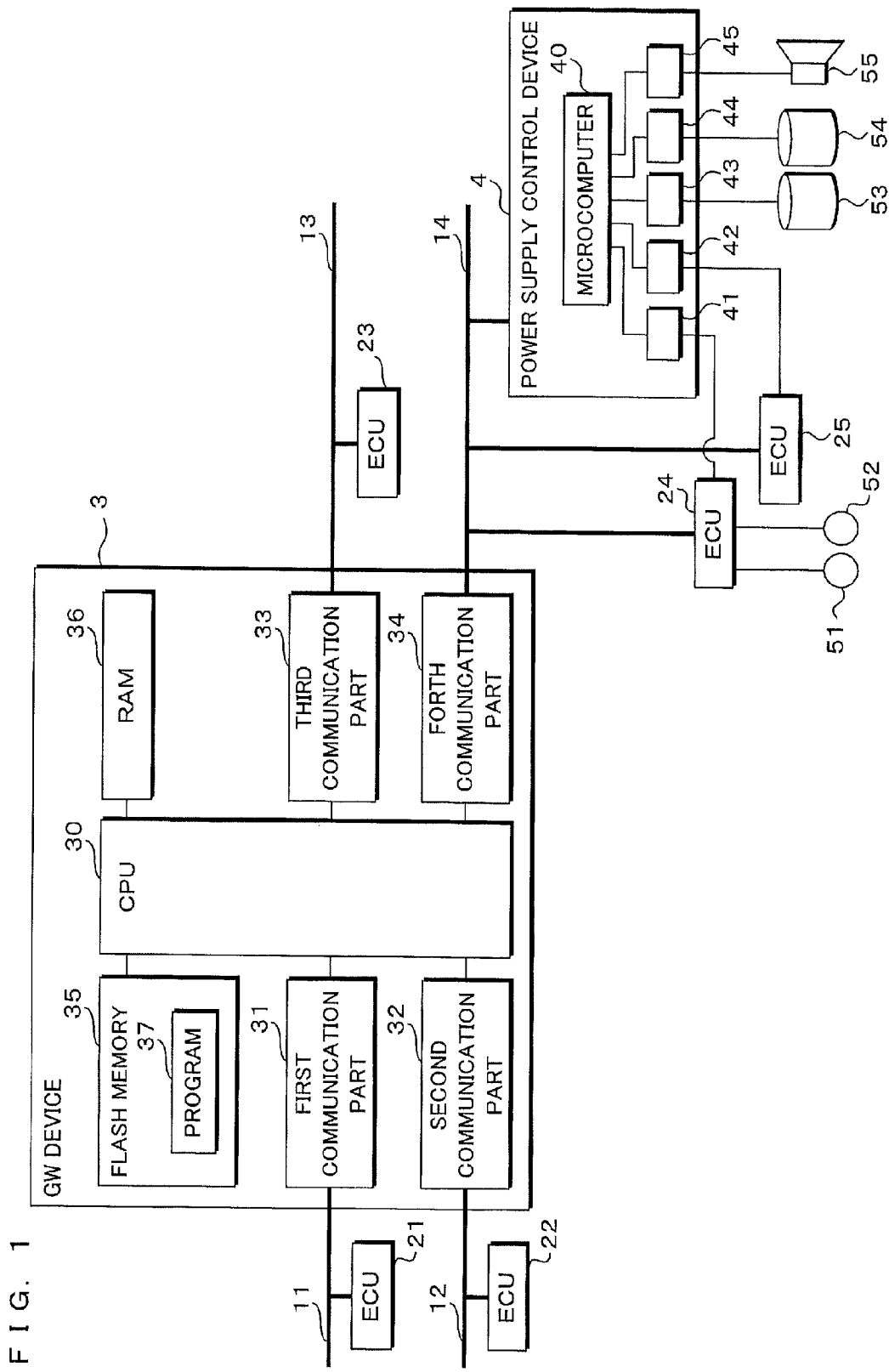
FIG. 1 is a block diagram that shows the configuration of an on-vehicle communication system according to Embodiment 1.

FIG. 1 is a block diagram that shows the configuration of an on-vehicle communication system according to Embodiment 1.

The on-vehicle communication system includes a plurality of communication buses 11 to 14, ECUs 21 to 25 respectively connected to the communication buses 11 to 14 for controlling devices, a GW (Gate Way) device 3 executing relay processing for information among the communication buses 11 to 14, a power supply control device 4 executing power supply control of each device, and loads 51 to 55 to be controlled.

In Embodiment 1, communication via any of the communication buses 11 to 14 is compliant with a CAN protocol. The plurality of communication buses 11 to 14 are discriminated by the types of subjects to be controlled by the connected ECUs 21 to 25. In other words, the plurality of communication buses 11 to 14 are discriminated by the types of information to be transmitted or received. A communication speed may be set differently for each of the communication buses 11 to 14. For example, the plurality of ECUs 21 for performing a chassis control including dynamic control, travel control and the like are connected to the communication bus 11, and the information of a measuring instrument and information on traveling control are transmitted/received through the communication bus 11. The plurality of ECUs 22 for performing control of a power supply control system are connected to the communication bus 12, and the information on power supply control system such as battery information is transmitted/received through the communication bus 12. The plurality of ECUs 23 for performing control of an accessory system such as a car-navigation system are connected to the communication bus 13, and the information on multimedia system such as time information and position information are transmitted/received through the communication bus 13. The plurality of ECUs 24 for performing body control are connected to the communication bus 14, and the information related to door lock, security and the like is transmitted/received through the communication bus 14.

The ECUs 21 to 25 include a microcomputer (not illustrated) and a CAN transceiver, which are respectively connected to the communication buses 11 to 14. The microcomputers included in the ECUs 21 to 25 having a CAN controller function receive a CAN message transmitted to the communication buses 11 to 14 and also transmit a CAN message. Sensors (not illustrated) are connected to the ECUs 21 to 23. The microcomputers of the ECUs 21 to 23 transmit CAN messages including signal information obtained from the sensors to the communication buses 11 to 13 respectively. The ECU 24 connects to actuators 51, 52. The microcomputer of the ECU 24 controls the operation of the actuators 51, 52 based on the signal information included in a CAN message transmitted to the communication bus 14. The ECU 25 also connects to a sensor (not illustrated) or an actuator to control the operation of the sensor or the actuator.

The GW device 3 includes a CPU (Central Processing Unit) 30, a first communication part 31, a second communication part 32, a third communication part 33, a fourth communication part 34, a flash memory 35 and a RAM (Random Access Memory) 36.

The CPU 30 uses the RAM 36 as a transmit buffer or receive buffer to achieve relay processing by executing transmitting/receiving via the first to fourth communication parts 31 to 34 based on a program 37 stored in the flash memory 35. The CPU 30 may be substituted by an MPU (Micro Processing Unit).

Each of the first to fourth communication parts 31 to 34 includes a CAN controller and a CAN transceiver to achieve transmitting/receiving of a CAN message based on a CAN protocol. The first communication part 31 is connected to the communication bus 11; the second communication part 32 is connected to the communication bus 12; the third communication part 33 is connected to the communication bus 13; and the fourth communication part 34 is connected to the communication bus 14. The first communication part 31 detects a CAN message transmitted to the communication bus 11 and then performs notification of receiving interruption to the CPU 30. Similarly, the second to fourth communication parts 32 to 34 detect CAN messages transmitted to the communication buses 12 to 14, which are respectively connected thereto, and then notify the CPU 30 of receiving interruption.

The flash memory 35 is a rewritable nonvolatile memory, and stores the program 37 read out by the CPU 30. Other nonvolatile memory such as an EEPROM (registered trademark) may also be used for the substitution of the flash memory 35.

The RAM 36 is used as a transmit/receive buffer. The CPU 30 temporarily stores CAN messages received by the first to fourth communication parts 31 to 34 and CAN messages transmitted from the first to fourth communication parts 31 to 34 into the RAM 36.

It is to be noted that the CPU 30, the CAN controller parts in the first to fourth communication parts 31 to 34, the flash memory 35 and the RAM 36 may be configured as one microcomputer.

The power supply control device 4 includes a microcomputer 40 and switches 41 to 45 connected to the microcomputer 40. The microcomputer 40 has a CAN controller function to receive a CAN message transmitted to the communication bus 14 via the CAN transceiver (not illustrated). The switches 41 to 45 are respectively connected to the ECU 24, the ECU 25, and the loads 53 to 55 that are the power supply controlled object by using semiconductor fuses. The switches 41 to 45 input a control signal indicative of power on/off from the microcomputer 40, and controls on/off of the connected power supply controlled objects based on the control signal. The microcomputer 40 outputs a control signal to the switches 41 to 45 based on the signal information related to power supply control included in the received CAN message. The switches 41 to 45 may be relay switches, however, they may be configured by using semiconductor fuses to aim for miniaturization and light-weighting.

An overview of relay processing carried out by the GW device 3 in the on-vehicle communication system configured as above is described hereinafter. When a CAN message is received by any of the first to fourth communication parts 31 to 34, the CPU 30 of the GW device 3 stores the CAN message into a receive buffer. The CPU 30 extracts the necessary signal information from the CAN message stored in the receive buffer and then temporarily stores the extracted necessary signal information. The CPU 30 creates a CAN message to be transmitted at the transmit buffer based on the extracted signal information periodically or according to a predetermined timing, such as at the occurrence of an event or the like. The CPU 30 transmits the created CAN message from the first to fourth communication parts 31 to 34 as required. Thereby, the GW device 3 achieves a relay processing of various information by the method in which a CAN message including information required for a relay destination is created and transmitted, but not the method in which the received CAN message is transmitted/received without modifications thereto.

Relay processing carried out by the GW device 3 is described in detail with reference to flowcharts.

Figure 2:
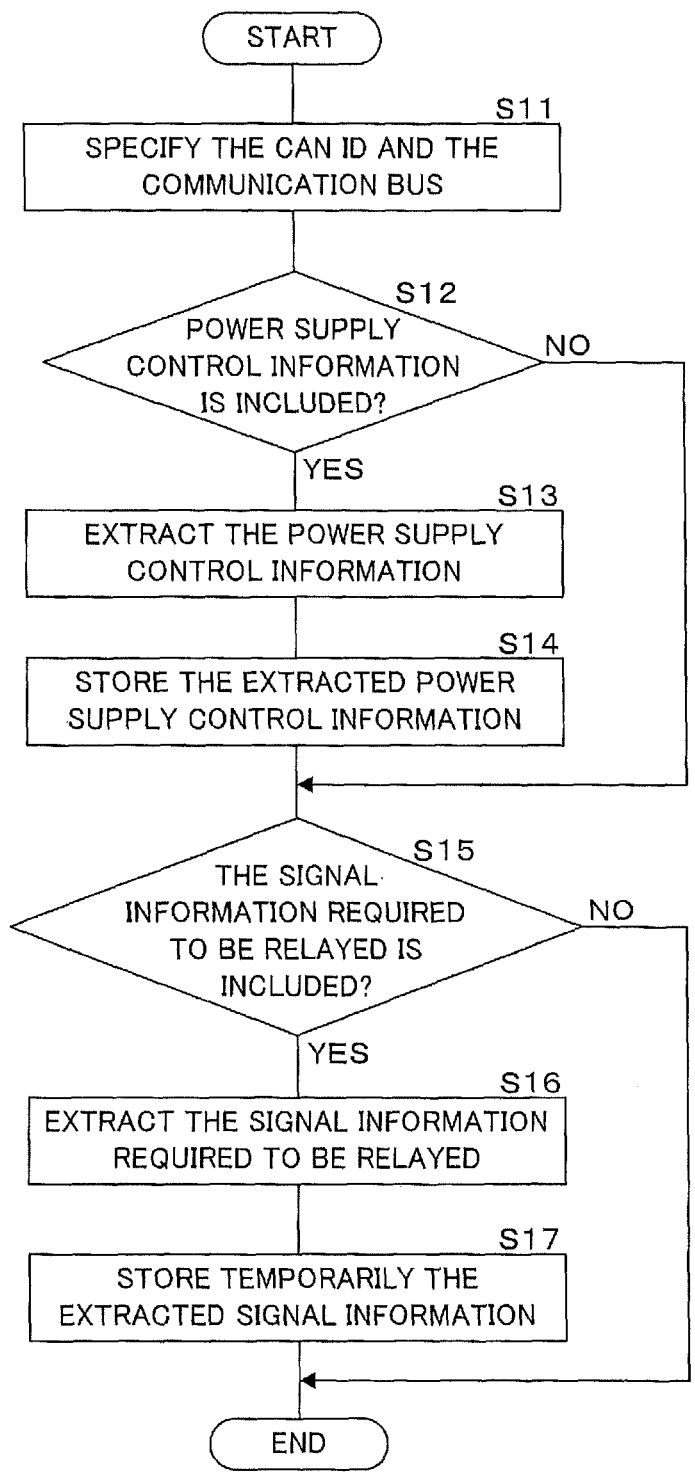
FIG. 2 is a flowchart that shows an example of processing procedures when receiving a CAN message in relay processing carried out by a GW device according to Embodiment 1.

FIG. 2 is a flowchart that indicates an example of processing procedures when receiving a CAN message in relay processing carried out by the GW device 3 according to Embodiment 1. In a case where notification of receiving interruption is transmitted to the CPU 30, the CPU 30 executes the following processing.

The CPU 30 specifies a CAN ID of the received CAN message and which one of the communication buses 11 to 14 received the message (step S11).

The CPU 30 determines whether or not signal information (power supply control information) required by the power supply control device 4 is included in the received CAN message based on the specified CAN ID and communication bus (step S12). If it is determined that the power supply control information is included (S12: YES), the CPU 30 extract the power supply control information (step S13), and then temporarily stores the extracted power supply control information into the RAM 36 (step S14).

The CPU 30 determines whether or not the information required to be relayed is included in the received CAN message based on the specified CAN ID and the communication bus (step S15).

If it is determined that the information required to be relayed is included at step 15 (S15: YES), the CPU 30 extracts the necessary signal information from the received CAN message (step S16). The CPU 30 temporarily stores the extracted signal information into the RAM 36 (step S17) and then terminates receiving processing.

Figure 3:
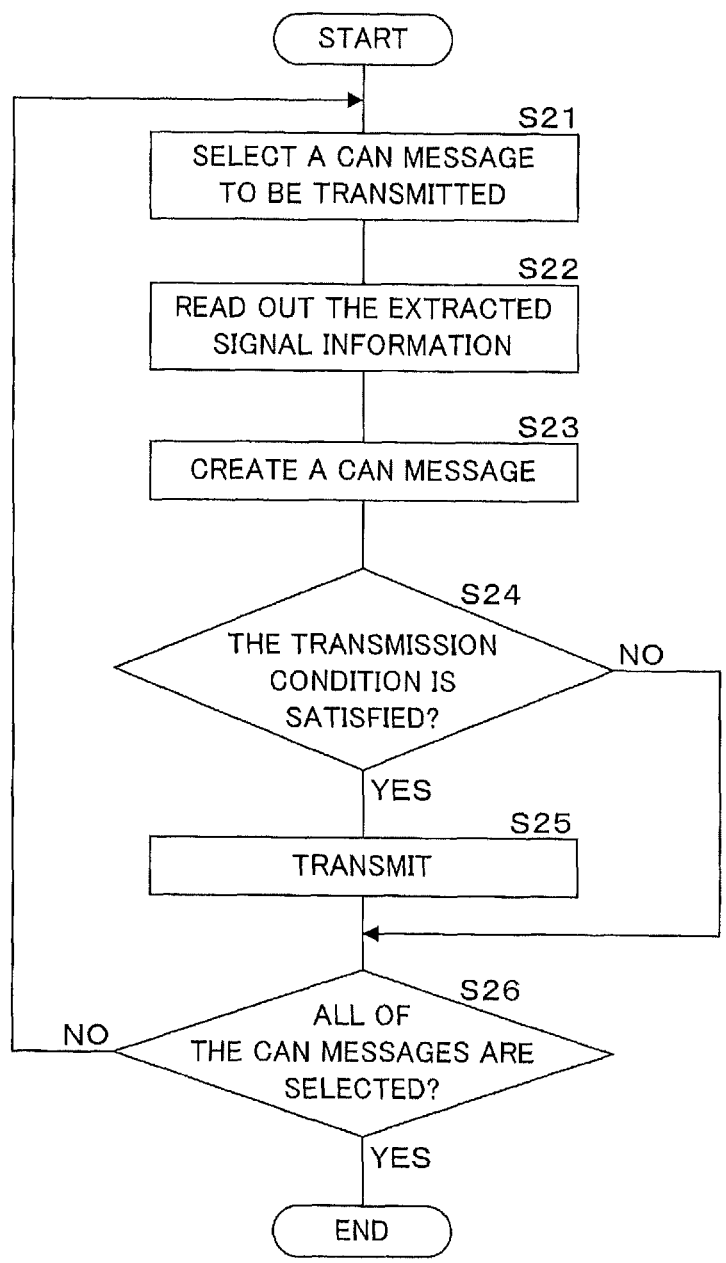
FIG. 3 is a flowchart that shows an example of processing procedures when transmitting a CAN message in relay processing carried out by the GW device according to Embodiment 1.

FIG. 3 is a flowchart that shows an example of processing procedures when transmitting a CAN message in relay processing carried out by the GW device 3 according to Embodiment 1. The GW device 3 may execute the following processing whenever a CAN message is received or may execute the processing periodically. A transmission timing is stored along with the information specifying a CAN message to be transmitted. When the transmission timing of each CAN message arrives, the following processing is executed. In a case of performing periodically, the GW device 3 counts a certain period of, for example, ten milliseconds at a timer part (not illustrated), and then notifies the CPU 30 of timer interruption whenever ten milliseconds have elapsed. The CPU 30 executes the following transmitting (relay) processing in a case where the timer interruption is notified.

The CPU 30 selects a CAN message to be transmitted (step S21). The CPU 30 reads out the signal information extracted as it requires to be relayed (step S22), and then creates a CAN message by selecting the signal information to be included in the selected CAN message to be transmitted from the extracted signal information (step S23).

The CPU 30 determines whether the transmitting condition for the created CAN message is satisfied or not (step S24). For example, as for the case where processing procedures illustrated in FIG. 3 is executed periodically (at every ten milliseconds), when the transmission condition is set to perform transmission at every thirty milliseconds which is three times as much as the period, the CPU 30 determines that the transmission condition is not satisfied after ten milliseconds or twenty milliseconds have elapsed.

If it is determined that the transmission condition is satisfied (S24: YES), the CPU 30 provides and transmits the created CAN message to any of the first to fourth communication parts 31 to 34 being as a relay destination (step S25).

The CPU 30 determines whether all of the CAN messages to be transmitted are selected or not (step S26). If it is determined that that all of the CAN messages are selected at step S26 (S26: YES), then the CPU 30 terminates relay processing.

If it is determined that the transmission condition is not satisfied at step S24 (S24: NO), then the CPU 30 proceeds to step S26.

If it is determined that there are unselected CAN messages at step S26 (step S26: NO), the CPU 30 returns the process to step S21, and then processing is executed for the next CAN message to be transmitted.

Figure 4:
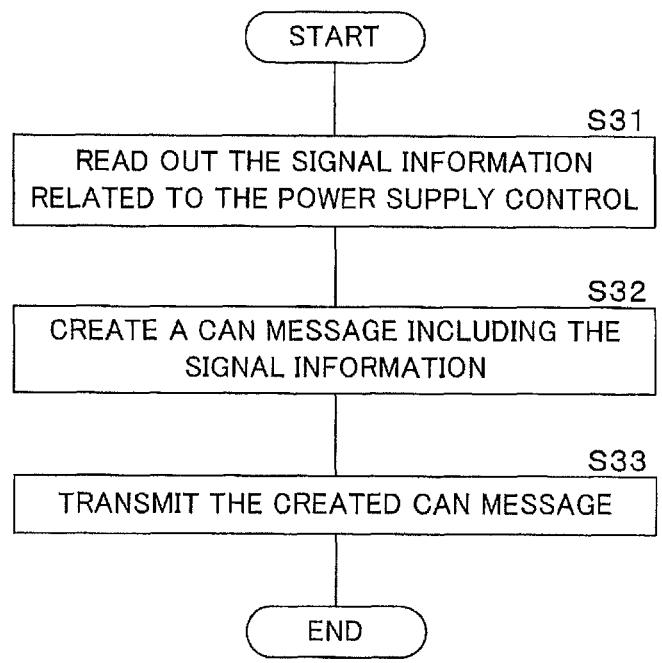
FIG. 4 is a flowchart that shows an example of processing procedures when transmitting a CAN message related to power supply control in relay processing carried out by the GW device according to Embodiment 1.

FIG. 4 is a flowchart that shows an example of processing procedures when transmitting a CAN message related to power supply control in relay processing carried out by the GW device 3 according to Embodiment 1. When the transmission timing related to power supply control information required from the power supply control device 4 arrives, the following processing is executed. A transmission timing required by the power supply control device 4 may be periodically or at the occurrence of an event such as when signal information is changed to predetermined information.

The CPU 30 reads out the temporarily stored signal information related to the power supply control from the RAM 36 (step S31), creates a CAN message related to power supply control including the signal information read out (step S32), transmits the created CAN message from the fourth communication part 34 connected to the power supply control device 4 (step S33), and then terminates processing.

The above processing is described particularly with reference to a schematic view.

Figure 5:
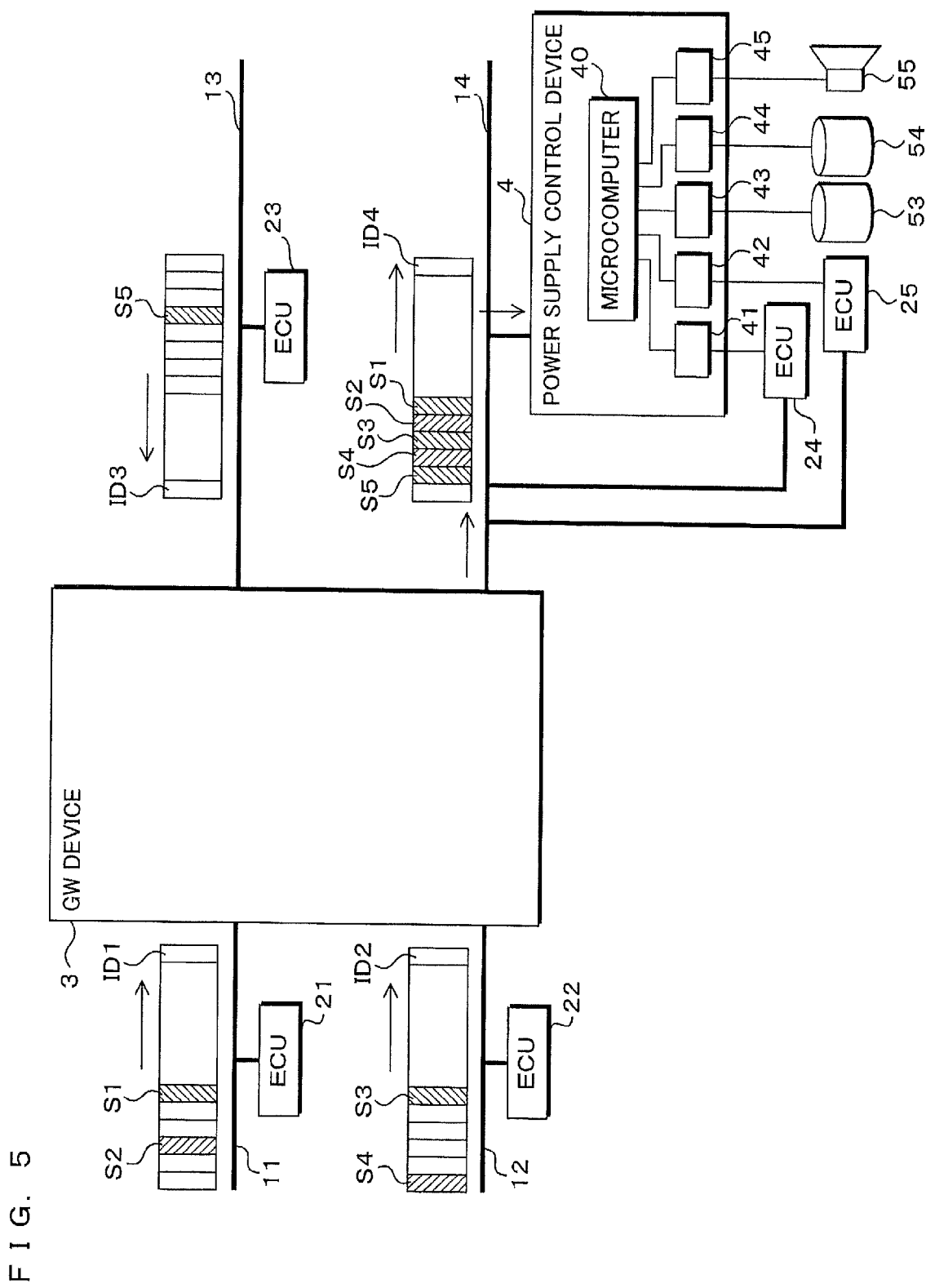
FIG. 5 is a schematic view that schematically shows an overview of processing carried out by the GW device and a power supply control device according to Embodiment 1.

FIG. 5 is a schematic view that schematically shows an overview of processing carried out by the GW device 3 and the power supply control device 4 according to Embodiment 1. With the example shown in FIG. 5, the power supply control device 4 needs signal information S1 to S5 for performing power supply control of the ECU 24 (actuator 51), the ECU 25 (actuator 52), and the loads 53 to 55. Thus, when a CAN message with the CAN ID being "ID 1" is received from the communication bus 11, the CPU 30 of the GW device 3 extracts the signal information S1 and S2 included in the received CAN message and then stores the extracted signal information into the RAM 36. In addition, when a CAN message with the CAN ID being "ID 2" is received from the communication bus 12, the CPU 30 of the GW device 3 extracts the signal information S3 and S4 included in the received CAN message and stores the extracted signal information into the RAM 36. Moreover, when a CAN message with the CAN ID being "ID3" is received from the communication bus 13, the CPU 30 of the GW device 3 extracts the signal information S5 included in the received CAN message and then stores the extracted information into the RAM 36. The CPU 30 of the GW device 3 creates a CAN message with the CAN ID being "ID4" including the signal information S1 to S5 related to power supply control stored in the RAM 36 at a timing required by power supply control device 4, and then transmits the created CAN message to the communication bus 14. The microcomputer 40 of the power supply control device 4 receives the CAN message with the CAN ID being "ID4" transmitted to the communication bus 14 and then performs power supply control of the ECU 24 (actuator 51), the ECU 25 (actuator 52), and the loads 53 to 55 by inputting control signals to the switches 41 to 45 based on the signal information S1 to S5 included in the received CAN message.

In this way, the GW device 3 creates a CAN message that contains all of the signal information S1 to S5 related to power supply control of the ECU 24, the ECU 25, and the loads 53 to 55, and then transmits the created CAN message to the power supply control device 4. Thereby, with the power supply control device 4, it is not necessary to make a request to the GW device 3 for a relay of each CAN message including signal information required for power supply control, extract necessary signal information from each CAN message and determine power supply control. Since the microcomputer 40 of the power supply control device 4 is not required to perform complicated processing, it is possible to use a low-cost, general-used microcomputer. In addition, the power supply control device 4 may be miniaturized and light-weighted by the switches 41 to 45 using semiconductor fuses. Moreover, the configuration of transmitting a CAN message including all of the signal information S1 to S5 has an effect of reducing communication loads over the configuration of transmitting a plurality of CAN messages respectively including signal information S1 to S5.

The power supply control device 4 according to Embodiment 1 is configured to input control signals for controlling power on/off to the switches 41 to 45. However, the present invention is not restricted to this case, the power supply control device 4 may also alternatively perform adjustment such as making the ECU 24, the ECU 25, and the loads 53 to 55 in a power-saving mode. In this case, the power supply control device 4, in particular, adjusts a current amount and a voltage value supplied to loads. Thereby, power saving can be achieved properly, and battery exhaustion can also be prevented by cutting power supply of devices which are not needed.

Embodiment 2

In Embodiment 1, the GW device 3 is configured to create a CAN message including signal information extracted from the received CAN message as it is when the GW device 3 creates a CAN message related to power supply control. In Embodiment 2, the GW device 3 creates control information for providing an instruction to turn power on/off based on the extracted signal, and then creates a CAN message including the control information and transmits it.

Figure 6:
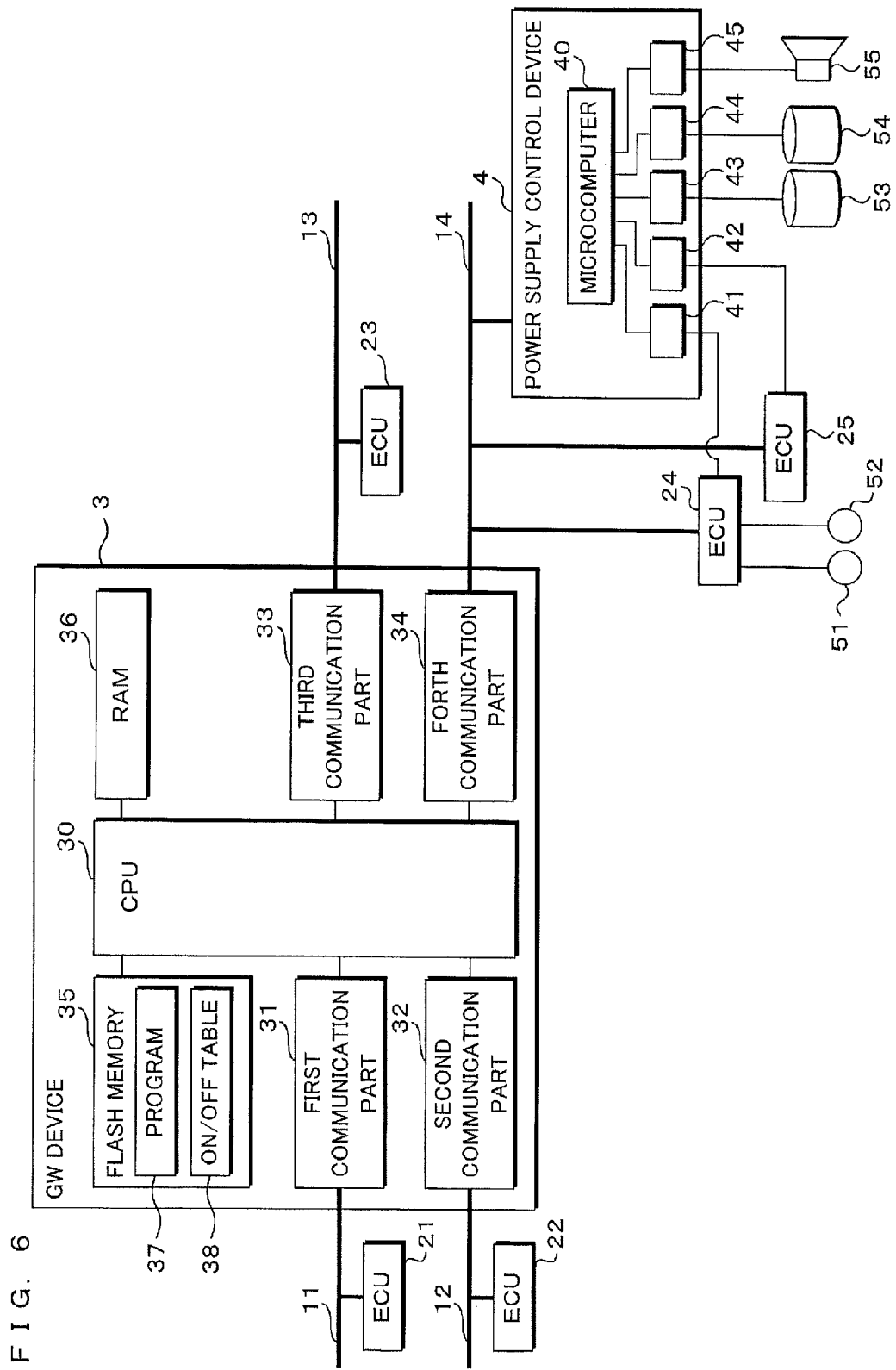
FIG. 6 is a block diagram that shows the configuration of an on-vehicle communication system according to Embodiment 2.

FIG. 6 is a block diagram that shows the configuration of an on-vehicle communication system according to Embodiment 2. In Embodiment 2, the GW device 3 stores an on/off table 38 into the flash memory 35. The configuration of the on-vehicle communication system according to Embodiment 2 is similar to the configuration according to Embodiment 1 except the GW device 3 comprising the on/off table 38 and the detailed parts of the following relay processing. Accordingly, the same reference numerals are appended to the similar configuration, and the detailed description thereof is not described.

FIG. 7 is an explanatory drawing that shows an example the content of the on/off table 38 included in the GW device 3 according to Embodiment 2. The on/off table 38 shows the correspondence between the condition based on the contents of the signal information S1 to S5 and the control information for providing an instruction to turn on/off of a subject to be controlled by power supply in accordance with each condition. The control information consists of, for example, 8-bit information as shown in FIG. 7. The first 2-bits correspond to a control signal that is inputted to the switch 41; the next 2-bits correspond to a control signal that is inputted to the switch 42; the next 1-bit corresponds a control signal that is inputted to the switch 43; and the next 1-bit corresponds to a control signal that is inputted to the switch 44; and the last 2-bits correspond to a control signal that is inputted to the switch 45.

With the example shown in FIG. 7, for example, when the signal information S1 is "1 (i.e. switched-on)"; the signal information S2 is "1 (switched-on); the signal information S3 to S5 are "0 (switched-off)," the condition corresponds to the control information "01010000(b)." The CPU 30 of the GW device 3 transmits a CAN message including "01010000(b)" in the data part when all pieces of the extracted signal information S1 to S5 meet the condition.

Figure 8:
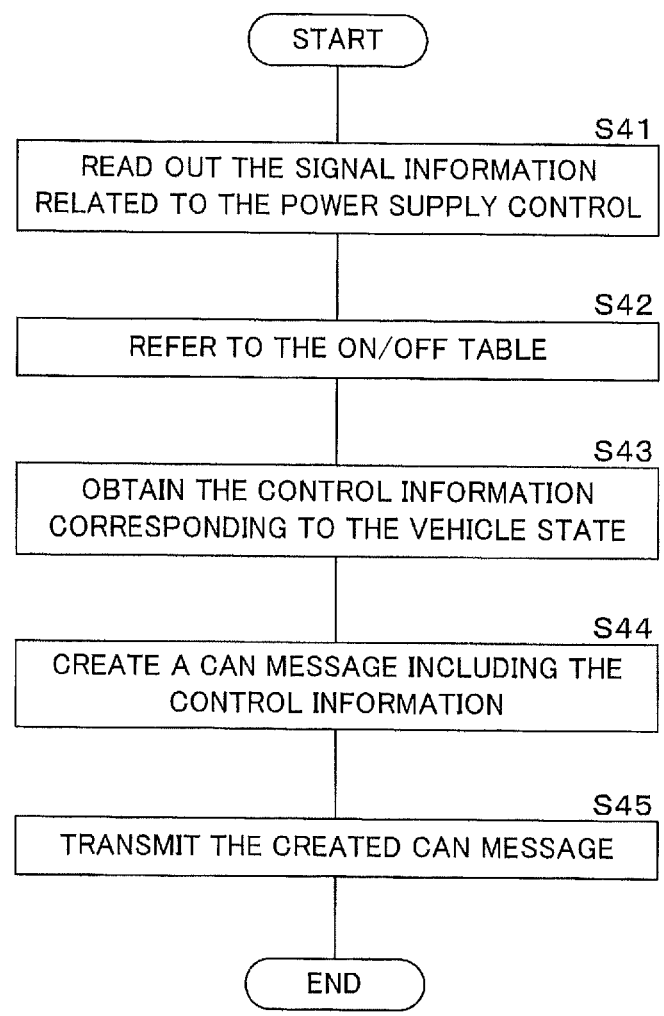
FIG. 8 is a flowchart that shows an example of processing procedures when transmitting a CAN message related to power supply control carried out by the GW device according to Embodiment 2.

FIG. 8 is a flowchart that illustrates an example of processing procedures when transmitting a CAN message related to power supply control carried out by the GW device 3 according to Embodiment 2. Also in Embodiment 2, when the transmission timing related to power supply control information required from the power supply control device 4 arrives, the following processing is executed. The transmission timing required by the power supply control device 4 may be periodically or at the occurrence of an event such as when signal information is changed to predetermined information.

The CPU 30 reads out the temporarily stored signal information related to power supply control from the RAM 36 (step S41), and refers to the on/off table 38 from the flash memory 35 (step S42). The CPU 30 obtains control information corresponding to the condition of the signal information read out at step S41 (step S43).

The CPU 30 creates a CAN message related to power supply control including control information obtained at step S43 (step S44), and transmits the created CAN message from the fourth communication part 34 connected to the power supply control device 4 (step S45), and then terminates processing.

Figure 9:
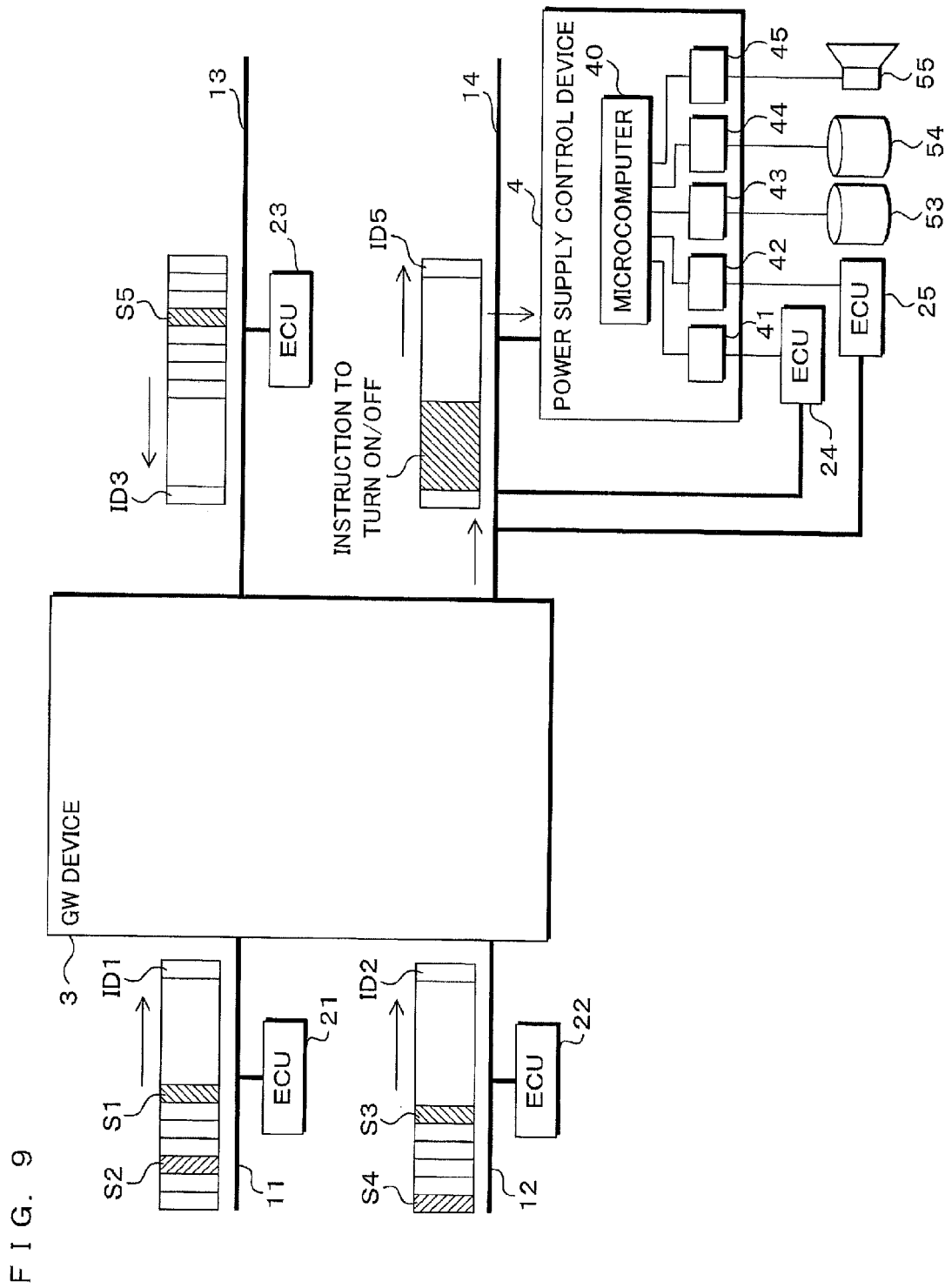
FIG. 9 is a schematic view that schematically shows an overview of processing carried out by the GW device and a power supply control device according to Embodiment 2.

FIG. 9 is a schematic view that schematically shows an overview of processing carried out by the GW device 3 and the power supply control device 4 according to Embodiment 2. Thus, when a CAN message with the CAN ID being "ID 1" is received from the communication bus 11, the CPU 30 of the GW device 3 extracts the signal information S1 and S2 included in the received CAN message and then stores the extracted signal information into the RAM 36. In addition, when a CAN message with the CAN ID being "ID 2" is received from the communication bus 12, the CPU 30 of the GW device 3 extracts the signal information S3 and S4 included in the received CAN message and stores the extracted signal information into the RAM 36. Moreover, when a CAN message with the CAN ID being "ID3" is received from the communication bus 13, the CPU 30 of the GW device 3 extracts the signal information S5 included in the received CAN message and then stores the extracted signal information into the RAM 36. The CPU 30 of the GW device 3 creates a CAN message including control information (information for providing an instruction to turn power on/off) corresponding to the contents of signal information S1 to S5 related to power supply control stored into the RAM 36 at a timing required by the power supply control device 4, and then transmits it to the communication bus 14. This CAN message has the CAN ID being "ID5". The microcomputer 40 of the power supply control device 4 receives a CAN message with the CAN ID being "ID5" transmitted to the communication bus 14, and then creates control signals, which are respectively inputted to the switches 41 to 45, obtained from the control information included in the received CAN message. Thereby, the power supply control of the ECU 24 (actuator 51), the ECU 25 (actuator 52), and the loads 53 to 55 is executed.

In Embodiment 2, the control information received by the power supply control device 4 directly corresponds to a control signal inputted to each of the switches 41 to 45. Accordingly, the microcomputer 40 of the power supply control device 4 is not necessary to execute determination processing, therefore, the microcomputer 40 may be configured simply.

The CPU 30 of the GW device 3 according to Embodiment 2 is configured to create a CAN message including control information for providing an instruction to turn on/off by referring to the on/off table 38. However, the present invention is not restricted to this case. The content of the on/off table 38 may be incorporated into the program 37 to create a CAN message including control information without the on/off table 38.

Embodiment 3

In Embodiment 3, the GW device 3 comprehensively specifies the vehicle state based on not only a CAN message transmitted to the communication buses 11 to 14, but also the information obtained from sensors and switches mounted within a vehicle and the out-of-vehicle communication and creates information related to power supply control corresponding to the specified vehicle state and then transmits the created information to the power supply control device 4.

Figure 10:
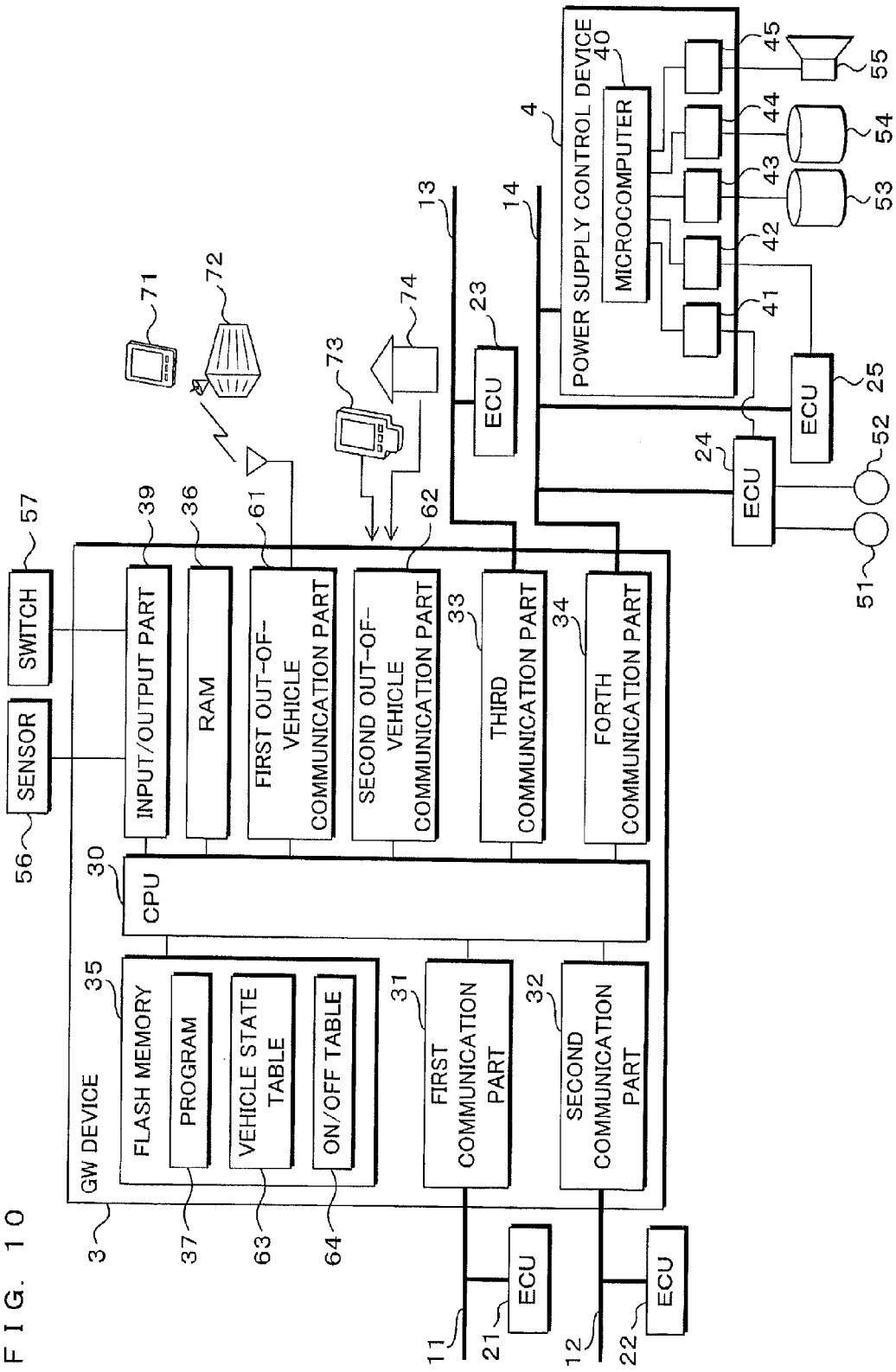
FIG. 10 is a block diagram of the configuration of an on-vehicle communication system according to Embodiment 3.

FIG. 10 is a block diagram that shows the configuration of an on-vehicle communication system according to Embodiment 3. In Embodiment 3, the GW device 3 further includes an input/output part 39 connected to a sensor 56 and a switch 57, a first out-of-vehicle communication part 61 and a second out-of-vehicle communication part 62. The GW device 3 according to Embodiment 3 stores the vehicle state table 63 and the on/off table 64 into the flash memory 35. The configuration of the GW device 3 according to Embodiment 3 is similar to the configuration according to Embodiment 1 except that the GW device 3 includes the input/output part 39, the first out-of-vehicle communication part 61, the second out-of-vehicle communication part 62, the vehicle state table 63 and the on/off table 64 as described above and the detailed part of the following relay processing is different. Accordingly, the same reference numerals are appended to the common configurations and therefore the detailed description is not described below.

The input/output part 39 is a connector that connects to the sensor 56 and the switch 57. The CPU 30 obtains a measurement value measured by the sensor 56 via the input/output part 39. The CPU 30 obtains the state of the switch 57 via the input/output part 39.

The sensor 56 is a sensor that measures, for example, a wheel speed. The CPU 30 obtains a wheel speed through the sensor 56 to interpret a vehicle state such as whether the vehicle is running or not. The sensor 56 may be an oil temperature sensor or a battery remaining amount sensor. In this case, the CPU 30 can detect a vehicle's abnormal state based on the information obtained from the sensor 56.

The switch 57 is, for example, an ignition switch. The CPU 30 obtains which of an off (lock) state, an accessary state, an on state, a start state or the like the ignition switch 57 is in via the input/output part 39, and understands a vehicle state according to the state of the ignition switch.

Regardless of the ignition switch being in an off state, when the CPU 30 obtains information that shows the vehicle in motion detected from the sensor 56 serving as a sensor measuring a wheel speed, it is also capable of detecting that the vehicle is in an abnormal state.

The first out-of-vehicle communication part 61 has an antenna for wireless communication, and achieves wireless communication at close range with a communication device such as, for example, the so-called smartphone 71 brought into the vehicle. The first out-of-vehicle communication part 61 may also achieves wireless communication with a server 72 owned by a vehicle manufacturer or vehicle dealer. The first out-of-vehicle communication part 61 may also have a function that achieves inter-vehicle communication, road-to-vehicle communication or the like. The first out-of-vehicle communication part 61 is capable of receiving information related to power saving transmitted from the smartphone 71 or the like and then notifying the CPU 30 thereof, receiving information from a roadside unit and notifying the CPU 30 thereof, and transmitting diagnostics information to the server 72 according to the instructions from the CPU 30.

The second out-of-vehicle communication part 62 is a connector that connects to a communication line of a cable communication. The second out-of-vehicle communication part 62, for example, accepts a connection with a diagnostics terminal 73 at the time of inspection or the like in a vehicle dealership. In addition, the second out-of-vehicle communication part 62 is a PLC connector, and may accept a connection to an in-home LAN 74 of the owner of a vehicle. The second out-of-vehicle communication part 62 is capable of receiving updated information or information related to power supply control from the diagnostics terminal 73 and notifying the CPU 30 thereof, and transmitting/receiving information related to power supply control (such as historical information or power saving information) through the in-home LAN 74.

In Embodiment 3, the GW device 3 stores the vehicle state table 63 and the on/off table 64 into the flash memory 35.

FIG. 11 is an explanatory view that shows an example of the content of the vehicle state table 63 included in the GW device 3 according to Embodiment 3. The vehicle state table 63 shows the correspondence between inputs of the signal information S1 to S5 included in the CAN message received from each of the ECUs 21 to 23 via the communication buses 14, the information I1, I2, I3 . . . obtained from the sensor 56, the switch 57 and outside the vehicle or the like and outputs of identification information of the vehicle state, which can be specified by the inputs. For example, when the signal information S1 is "1" and S2 is "1," the vehicle state is "scene 1." When all the signal information S1 to S3 are "1" and the signal information S4 is "0," the vehicle state is "scene 2." When of the signal information S1 and S2 are "1" and the information I1 obtained from outside the vehicle corresponds to the value "x" and the information I2 also obtained from outside the vehicle corresponds to the value "y", the vehicle state is "scene 3." When the signal information S1 and S2 are "0" and the information I3 obtained from outside the vehicle corresponding to the value "y", the vehicle state is "scene N". The vehicle state "scene N" corresponds to an abnormal state. According to the vehicle state table 63, the CPU 30 inputs the acquired signal information S1 to S5, information such as a measurement value obtained via the input/output part 39, and information obtained via the first and second out-of-vehicle communication parts 61, 62, so that CPU 30 can specify a vehicle state from the vehicle state table 63. In addition, by including the conditions for discriminating an abnormal state in vehicle states, it is capable of detecting whether a vehicle is in an abnormal state by referring to the vehicle state table 63.

FIG. 12 is an explanatory view that shows an example of the content of the on/off table 64 included in the GW device 3 according to Embodiment 3. The on/off table 64 shows the correspondence between the information for identifying a vehicle state and the control information for providing an instruction to turn on/off of a power-controlled subject corresponding to each state. The information for identifying a vehicle state corresponds to the output of the vehicle state table 63 shown in FIG. 11. In the example shown in FIG. 12, when the vehicle state is "scene 1," the control information is "01010000(b)"; when the vehicle state is "scene 2," the control information is "01011100(b)"; and when the vehicle state is "scene 3," the control information is "00000001(b)." Additionally, when the vehicle state is "scene N", in other words, an abnormal state, the control information is "00001111(b)." This control information is for turning off power of the loads 53 to 55 related to an abnormal state corresponds to "scene N." Therefore, it is possible to minimize influences on the whole on-vehicle communication system by turning off power of the loads 53 to 55 related to an abnormal state.

It is possible to perform power supply control according to the attribute of each vehicle by changing the correspondence relation in the vehicle state table 63 and the on/off table 64 as shown in FIGS. 11 and 12 for every vehicle, every vehicle model or the like. It is capable of performing a proper power supply control according to a vehicle by, for example, changing the condition capable of identifying the vehicle state "scene 1" depending on a vehicle model, or configuring control information in which the devices with the power turned off differ according to a model and a destination even with the control information corresponding to the same vehicle state "scene 1".

Figure 13:
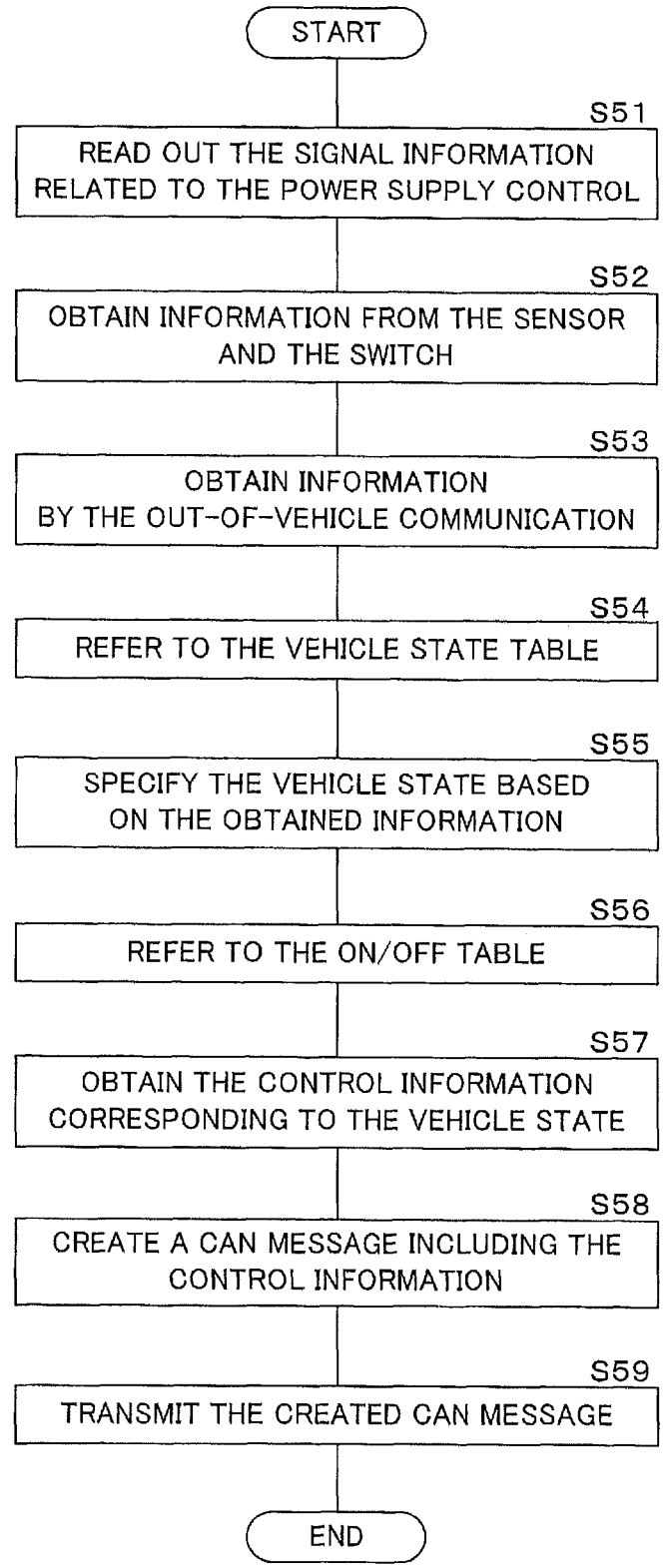
FIG. 13 is a flowchart that shows an example of processing procedures when transmitting a CAN message related to power supply control carried out by the GW device according to Embodiment 3.

FIG. 13 is a flowchart that shows an example of processing procedures when transmitting a CAN message related to power supply control carried out by the GW device 3 according to Embodiment 3. Also in Embodiment 3, when the transmission timing related to power supply control information required from the power supply control device 4 arrives, the following processing is executed. The transmission timing required by the power supply control device 4 may be periodically or at the time of an event such as when signal information is changed to predetermined information.

The CPU 30 reads out the temporarily stored signal information related to power supply control from the RAM 36 (step S51), and obtains information from the sensor 56 and the switch 57 through the input/output part 39 (step S52). The CPU 30 further receives and obtains information from the first out-of-vehicle communication part 61 and the second out-of-vehicle communication part 62 (step S53).

The CPU 30 refers to the vehicle state table 63 from the flash memory 35 (step S54) and specifies a vehicle state according to the vehicle state table 63 as the input of the signal information and various types of information obtained at steps S51 to S53 (step S55).

The CPU 30 then refers to the on/off table 64 from the flash memory 35 (step S56) and obtains control information corresponding to the vehicle state specified at step S55 (step S57).

The CPU 30 creates a CAN message related to power supply control including control information obtained at step S57 (step S58), and then transmits the created CAN message from the fourth communication part 34 connected to the power supply control device 4 (step S59), and finally terminates processing.

In Embodiment 3, the CPU 30 of the GW device 3 collectively specifies the vehicle state based on not only the obtained signal information S1 to S5 but also the information obtained from the sensor 56 and the switch 57 directly connected to the GW device 3 as well as the information obtained from the out-of-vehicle communication. Accordingly, fine power supply control can be facilitated. In addition, with the configuration of using the vehicle state table 63 for specifying a vehicle state, the change in input conditions for various information can be achieved. Moreover, with the configuration of using the on/off table 64 corresponding to a vehicle state, remarkable effects are generated such that it is capable of properly adjusting the condition of power supply control according to a vehicle model or manufacturer even with the same vehicle state and executing effective power supply control.

Embodiment 4

Figure 14:
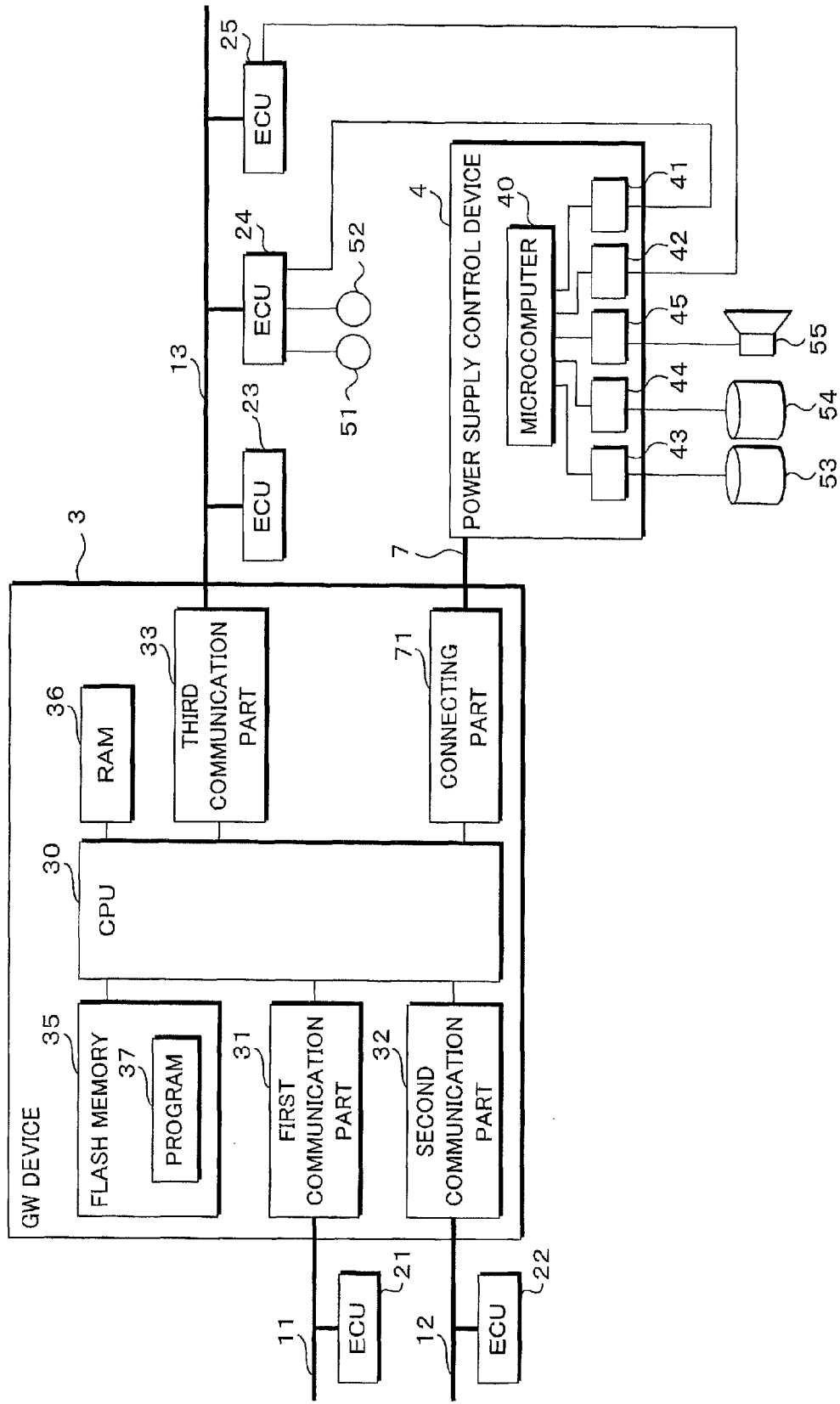
FIG. 14 is a block diagram that shows the configuration of an on-vehicle communication system according to Embodiment 4.
Figure 15:
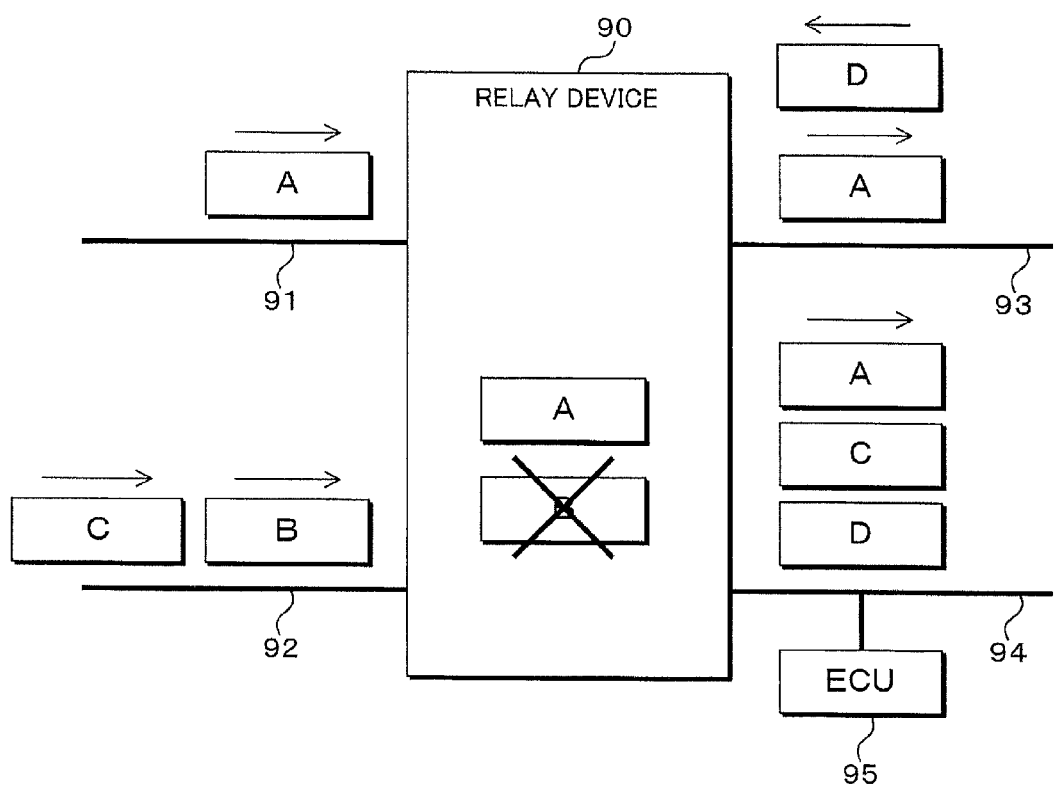
FIG. 15 is a schematic view that schematically shows an overview of processing in a case that conventional relay processing is applied to a relay device for performing a relay among four communication buses.

In Embodiments 1 to 3, the power supply control device 4 connects to the communication bus 14 similarly to the other ECUs 21 to 25, and transmits/receives a CAN message compliant to a CAN protocol via the communication bus 14. However, the present invention is not restricted to this configuration. FIG. 14 is a block diagram that shows the configuration of an on-vehicle communication system according to Embodiment 4.

As shown in FIG. 14, the GW device 3 is connected to the power supply control device 4 through a dedicated line 7 in Embodiment 4. The ECU 24 and the ECU 25 connect to the communication bus 13. The GW device 3 includes a dedicated connecting part 71 instead of the fourth communication part pursuant to the CAN protocol. The CPU 30 of the GW device 3 may transmit information related to power supply control according to a protocol that is not restricted to CAN to the power supply control device 4. Since the other configurations are similar to Embodiments 1 to 3, the detailed description thereof is not described below.

In all Embodiments 1 to 4, one power supply control device 4 exists in an on-vehicle communication system. However, the present invention is not restricted to this configuration, the on-vehicle communication system may include a plurality of power supply control devices so that power supply control devices respectively perform power supply control of ECUs, loads and the like.

It should be noted that the embodiments disclosed herein are illustrative and not restrictive in all aspects. The present invention is defined by the appended claims rather than by the description preceding them, and all changes that fall within metes and bounds of the claims, or equivalence of such metes and bounds thereof are therefore intended to be embraced by the claims.

The invention claimed is:

1. A communication system comprising:
a plurality of communication buses;
a plurality of communication devices connected to any one of the plurality of communication buses, and one communication device of the plurality of communication devices transmitting/receiving an information group of one or more pieces of information to/from one communication bus of the plurality of communication buses;
a relay device that relays information between different communication buses, the relay device including:
a plurality of communication parts respectively connected to the plurality of communication buses,
a communication control part transmitting/receiving an information group transmitted from each communication device through the plurality of communication parts,
an extracting part extracting information required for power supply control from the received information group, and
a creating part creating information related to power supply control based on information extracted from the extracting part; and
a power supply control device performing power supply control of one or a plurality of devices being connected, wherein:
the communication control part transmits information created by the creating part from a specified communication part among the plurality of communication parts, and
the power supply control device is connected to the specified communication part of the relay device for performing power supply control based on information transmitted from the relay device.

2. The communication system according to claim 1, wherein
the creating part collects information respectively extracted from different information groups by the extracting part to create information related to power supply control.

3. The communication system according to claim 1, wherein
the creating part creates control information for providing an instruction to turn power on/off of the one or a plurality of devices based on information extracted by the extracting part.

4. The communication system according to claim 1, wherein
the plurality of communication buses, the plurality of communication devices, the relay device and the power supply control device are mounted in a vehicle, and
the relay device further comprises a specifying part for specifying a vehicle state based on one or a plurality of pieces of information included in the received information group, and the creating part creates information related to power supply information corresponding to the vehicle state specified by the specifying part.

5. The communication system according to claim 4, wherein
the relay device further comprises a connecting part connected to a sensor or a switch arranged in a vehicle, or connected to both of the sensor and the switch, and
the creating part creates information related to the power supply control based on information obtained from the sensor or switch in addition to information extracted by the extracting part.

6. The communication system according to claim 4, wherein
the relay device further includes an out-of-vehicle communication part for transmitting/receiving information by a radio signal to/from an out-of-vehicle communication device, and
the creating part creates information related to the power supply control based on information received at the out-of-vehicle communication part in addition to information extracted by the extracting part.

7. The communication system according to claim 4, further comprising:
a vehicle state table storing correspondence between one or a plurality of pieces of information included in the information group and state identification information identifying a vehicle state determined from each piece of information, wherein
the relay device further includes a state information acquisition part acquiring information of a vehicle state from a vehicle state table, and
the specifying part specifies a vehicle state based on information obtained from the vehicle state table.

8. The communication system according to claim 4, further comprising:
an on/off table that stores information of power on/off, which is included in said one or a plurality of devices at each vehicle state for different vehicle states,
wherein the relay device further includes an on/off information acquisition part that acquires the information of power on/off corresponding to the vehicle state specified by the specifying part from the on/off table, and
the creating part creates control information that provides an instruction to turn power on/off of said one or a plurality of devices based on information obtained from the on/off table.

9. The communication system according to claim 4, wherein
the specifying part includes a detecting part that detects an abnormal state of a vehicle and specifies a vehicle being in an abnormal state when an abnormal state is detected; and
the creating part creates control information for providing an instruction to turn off of a device related to the abnormal state of the vehicle.

10. The communication system according to claim 5, further comprising:
a vehicle state table storing correspondence between one or a plurality of pieces of information included in the information group, of information obtained from the sensor, and state identification information identifying a vehicle state determined from each piece of information, wherein
the relay device further includes a state information acquisition part acquiring information of a vehicle state from a vehicle state table, and the specifying part specifies a vehicle state based on information obtained from the vehicle state table.

11. The communication system according to claim 6, further comprising:
a vehicle state table storing correspondence between one or a plurality of pieces of information included in the information group, information obtained from the sensor, or switch or information received at the out-of-vehicle communication device, and state identification information identifying a vehicle state determined from each piece of information, wherein
the relay device further comprises a state information acquisition part acquiring information of a vehicle state from a vehicle state table, and
the specifying part specifies a vehicle state based on information obtained from the vehicle state table.

12. A relay device for processing a relay, the relay device comprising;
a plurality of communication parts respectively connected to different communication buses;
a communication control part performing a relay of information among different communication buses through respectively receiving information groups of one or more pieces of information from the plurality of communication parts and transmitting an information group through one or more communication parts;
an extracting part extracting information required for power supply control from the information group received by the communication control part;
a creating part creating information related to power supply control based on the information extracted by the extracting part; wherein
the communication control part transmits the information created by the creating part from a specified communication part to another.

13. A method of performing power supply control of one or more devices by a power supply control device in a system including: (i) a plurality of communication buses, (ii) a plurality of communication devices respectively connected to any one of the plurality of communication buses, (iii) a relay device having a plurality of communication parts respectively connected to the plurality of communication buses and performing a relay of information among different communication buses, and (iv) the power supply control device connected to the relay device and the one or more devices, the method comprising the steps of:
respectively transmitting, by the plurality of communication devices, an information group of one or more pieces of information;
receiving, by the relay device, a plurality of information groups transmitted from a communication device;
extracting information required for the power supply control from the information groups received by the relay device;
creating information, by the relay device, that is related to power supply control information based on the extracted information;
transmitting, by the relay device, the created information related to power supply control to the power supply control device;
receiving, by the power supply control device, the information related to power supply control; and
executing power supply control, by the power supply control device, of the one or more devices based on the received information related to power supply control.

* * * * *